J. H. STOCKHOLDER.
SLEEVE VALVE.
APPLICATION FILED MAR. 19, 1920.
1,385,401.
Patented July 26, 1921.
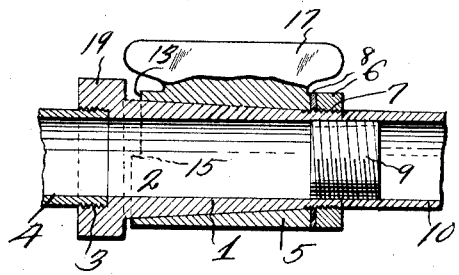
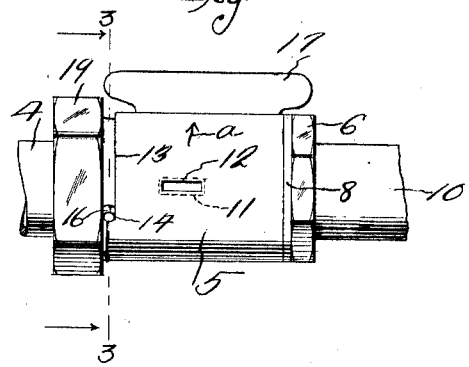
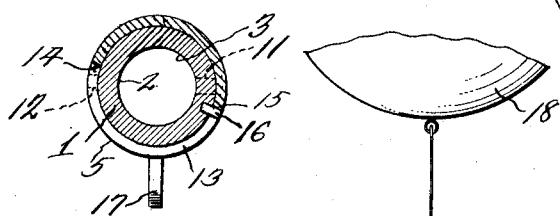
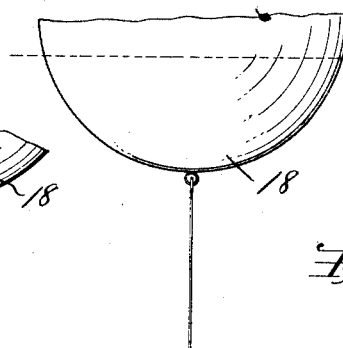
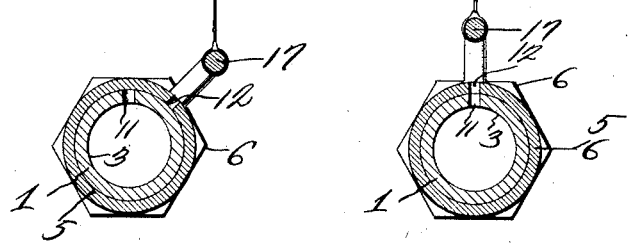
Inventor
John H. Stockholder
By D. Swift
Attorney

UNITED STATES PATENT OFFICE.

JOHN HENRY STOCKHOLDER, OF NEW ORLEANS, LOUISIANA.

SLEEVE-VALVE.

1,385,401.　　　　　Specification of Letters Patent.　　Patented July 26, 1921.

Application filed March 19, 1920. Serial No. 367,265.

*To all whom it may concern:*

Be it known that I, JOHN H. STOCKHOLDER, a citizen of the United States, residing at New Orleans, in the parish of Orleans, State of Louisiana, have invented a new and useful Sleeve-Valve; and I do hereby declare the following to be a full, clear, and exact description of the invention, such as will enable others skilled in the art to which it appertains to make and use the same.

The invention relates to sleeve valves and has for its object to provide a valve of this character comprising a hollow body member, its outer periphery being tapered toward one end for the reception of a rotatable sleeve similarly tapered, which sleeve is provided with a port adapted to be placed in registration with a port of a body member. Also to provide a threaded extension on the body member for the reception of an adjusting nut, whereby the rotatable sleeve may be adjusted incident to wear and regrinding, said extension having an internal thread for the reception of a pipe line.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the valve showing the ports in elevation.

Fig. 2 is a longitudinal sectional view through the valve.

Fig. 3 is a sectional view taken on line 3—3 of Fig. 1.

Fig. 4 is a sectional view through the valve showing the application thereof to a float.

Fig. 5 is a view similar to Fig. 4 but showing the valve open by the action of the float.

Referring to the drawings, the numeral 1 designates the body of the valve, which body is provided with a longitudinally disposed passage 2. One end of the body 1 is counterbored and threaded as at 3 for the reception of a pipe 4. The body member 1 tapers and has rotatably mounted thereon a sleeve 5, which sleeve is also tapered so that it will snugly fit the tapered periphery of the body member 1. Sleeve 5 is shorter than the tapered portion of the body member 1 so that it will be possible to take up the wear of the members incident to constant use or regrinding. Sleeve 5 is held in frictional engagement with the body member 1 by means of a lock nut 6 threaded on the threaded end 7 of the body member 1, there being a washer 8 interposed between the lock nut 6 and the end of the sleeve for preventing loosening of the nut 6 incident to rotation of the sleeve 5. The reduced end of the body member 1 is interiorly threaded for the reception of a nipple 9, which nipple receives on its projecting end one end of a pipe 10. It will be seen that water or other fluid will pass through the pipe 4, thence through the passage 2 of the body member 1, from which passage it will pass through the nipple 9 and pipe 10.

The body member is provided in its side wall with a port 11, which port forms an outlet for the pipe line when the port 12 of the sleeve 5 is placed in registration therewith by the rotation of the sleeve 5. One end of the sleeve 5 is cut away as at 13 so as to form a shoulder 14 for limiting the rotation of the sleeve 5 in the direction of the arrow *a* so that the ports 11 and 12 will register. The other end of the cutaway portion 13 forms a shoulder 15 for limiting the rotation of the sleeve 5 in an opposite direction so that it will be stopped at a point where the ports will be out of registration, said stopping of the sleeve being accomplished by a pin 16, which pin is carried by the body member 1. The rotation of the sleeve is accomplished by the operator grasping the handle 17 which is integrally joined thereto.

Referring to Figs. 4 and 5, it will be seen that the handle member 17 may have attached thereto a float 18 for operating the rotatable sleeve 5.

From the above it will be seen that a sleeve valve is provided which may be placed in a pipe line so that fluid from the pipe line may be allowed to leave the pipe line if so desired. It will also be seen that the valve forms a coupling and if so desired any number of the valves may be placed in a pipe line, for instance in connection with toilets. If the discharge from the pipe line is into tanks the level of the water within the tanks may control through the medium of floats, the closing or opening of the valve.

One end of the body member 1 is provided with a hexagonal enlargement 19 for the reception of a wrench so as to prevent the body member from rotation during the adjustment of the lock nut 6. It also forms means for rotating the valve as a whole and placing the same on the pipes.

The invention having been set forth what is claimed as new and useful is:—

A sleeve valve comprising a tapered casing, a rotatable sleeve shorter in length than the tapered casing rotatably mounted on the tapered casing, one end of the tapered casing extending beyond the rotatable sleeve and provided with threads, a lock nut threaded on said threaded end of the tapered sleeve and adapted to hold the rotatable sleeve in frictional engagement with the tapered casing and forming means for taking up wear incident to rotation of the sleeve thereby obviating regrinding, the other end of the tapered casing being provided with an integral wrench engaging portion for holding the same against rotation when the lock nut is being adjusted, means for connecting pipe lines to the ends of the tapered casing, ports carried in the walls of the tapered casing and the rotatable sleeve and adapted to be moved into and out of registration with each other, a handle member carried by the rotatable sleeve, said port in the tapering casing being upwardly disposed, an upwardly extending member having its lower end pivotally connected to the handle and a float connected to the upper end of the upwardly extending member and forming means whereby said ports will be moved into registration.

In testimony whereof I have signed my name to this specification in the presence of two subscribing witnesses.

JOHN HENRY STOCKHOLDER.

Witnesses:
 F. A. ABEL,
 W. VON BEHREN.